Jan. 6, 1970  B. J. SOBCZAK  3,488,098

MOTION TRANSLATING DEVICE

Filed March 26, 1968

INVENTOR
BERNARD J. SOBCZAK

BY Michael A. O'Neil
ATTORNEY

United States Patent Office 3,488,098
Patented Jan. 6, 1970

3,488,098
MOTION TRANSLATING DEVICE
Bernard J. Sobczak, Chicago, Ill., assignor to Teletype Corporation, Skokie, Ill., a corporation of Delaware
Filed Mar. 26, 1968, Ser. No. 716,149
Int. Cl. F16c *17/00, 27/00;* F16h *27/02*
U.S. Cl. 308—6                              1 Claim

ABSTRACT OF THE DISCLOSURE

A motion translator comprising a rectangular strip of thin, flexible resilient metal having an elongated rectangular slot formed in it and having a tongue similar in shape to the slot extending from one of its ends in combination with a cylinder. The tongue is inserted in the slot and the cylinder is inserted in the loop thus formed thereby forming a spring tensioned virtually frictionless device for translating rotary motion to linear motion and vice versa. When the total width of the slot bordering portions is less than the width of the tongue, the cylinder is urged in a predetermined direction.

Background of the invention

In the science of mechanical engineering new mechanisms for translating motion from one form to another are continually sought, particularly motion translators that have lower friction losses than those previously known. One such device that has recently enjoyed much publicity is the "Rolamite" which employs an S-shaped band positioned between two parallel planes in combination with two rollers positioned in the curved portions of the band to achieve virtually frictionless translation of rotary to linear motion and vice versa. However, notwithstanding the low friction characteristics of the "Rolamite," commercial adaptation of the device has been limited by the requirement that it be positioned between two parallel planes and by the fact that two rollers are needed in its construction.

Summary of the invention

In the preferred embodiment a low friction motion translator suitable for mounting on a single plane is constructed from a body of thin, flexible material having a slot formed in it and having a tongue extending from it in combination with a roller. The tongue is doubled back through the slot to form a loop, the roller is inserted in the loop and the loop is drawn tight around the roller thereby forming a device for translating rotary motion to linear motion without relative motion between the roller and the band and, therefore, without friction.

Description of the drawing

A more complete understanding of the invention may be had by referring to the following detailed description when taken in conjunction with the drawing wherein.

Detailed description

Figure 1:
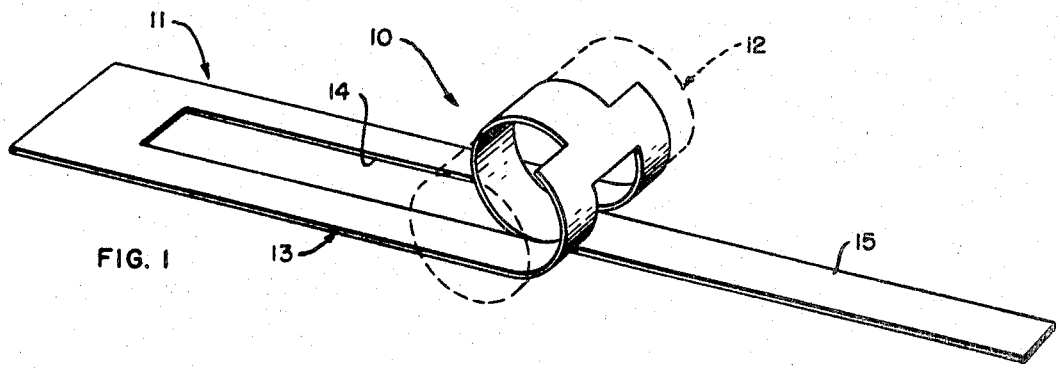
FIGURE 1 is a perspective view of a motion translating device employing the invention.

Referring now to the drawing, wherein like reference numerals designate like parts throughout the several views, and referring particularly to FIGURE 1, there is shown a motion translator 10 comprised of a strip of flexible material 11 and a roller 12. The roller 12 is illustrated in phantom lines in FIGURE 1 more clearly to illustrate the configuration of the strip 11; however, it should be understood that the roller 12 is actually a right circular cylinder which may be either solid or tubular, as desired. The strip 11 is comprised of a body 13 having a slot 14 formed in it and having a tongue 15 extending from it. As is best shown in FIGURE 2 both the slot 14 and the tongue 15 are rectangular in shape with the tongue 15 having slightly less width than the slot 14.

Figure 2:
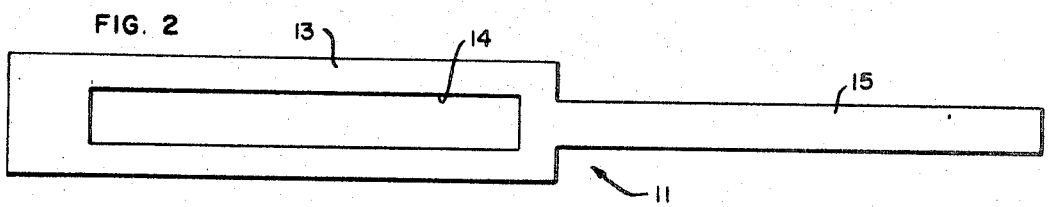
FIGURE 2 is a top view of the strip portion of the device shown in FIGURE 1.

A virtually frictionless motion translator is formed from the strip 11 shown in FIGURE 2 by doubling the tongue 15 of the strip 11 back through the slot 14 to form the loop-shaped configuraton shown in FIGURE 1. The cylindrical roller 12 is inserted in the loop thus formed, the loop is drawn tight around the roller and the ends of the strip 11 are secured in place. The motion translator 10 thus formed is virtually frictionless because the roller 12 travels with respect to the strip 11 without relative movement between the roller 12 and the portion of the strip 11 engaged therewith and because the roller 12 does not engage any other surface.

If the strip 11 is formed from a flexible material the roller 12 of the motion translator 10 will remain in any position to which it is moved. However, if the strip 11 is formed from a resilient material that tends to return to its former shape upon deformation, the roller 12 will tend to move to a particular place on the strip 11 dependent upon the relative widths of the tongue 15 of the strip 11 and the total of the widths of the portions of the body 13 of the strip that border the slot 14 thereof. Thus, if the strip shown in FIGURE 2 is formed so that the width of the tongue 15 is wider than the sum of the widths of the portions of the body 13 that border the slot 14 the roller will tend to move to the left, that is, toward the body 13 whereas if the sum of the widths of the portions of the body 13 that border the slot 14 is greater than the width of the tongue 15 the roller will tend to move toward the tongue.

Figure 3:
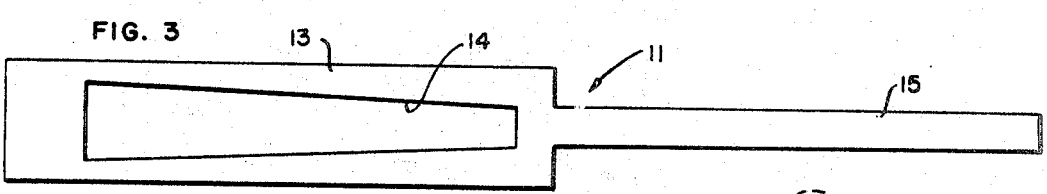
FIGURE 3 is a top view of an alternate strip portion that may be employed in the device shown in FIGURE 1.

The tendency of the roller 12 to position itself in a position is determined by the relative widths of the tongue 15 and the sum of the widths of the portions of the body 13 bordering the slot 14 can be used to advantage by forming the slot 14 in nonrectangular shapes. For example, as is shown in FIGURE 3, the slot 14 may be tapered from a width slightly greater than the width of the tongue 15 to a width much greater than the width of the tongue 15. When a slot 14 of such a configuration is formed in a strip 11 formed from a relatively stiff material and when the tongue 15 is doubled back through the slot 14 in the manner shown in FIGURE 1 the motion translator 10 forms a nonlinear spring in which movement of the roller 12 to the left is initially opposed by a relatively large force and is opposed by a steadily decreasing force of the roller moves to the left. If the tapering of the slot 14 is continued until the sum of the widths of the portions of the body 13 bordering the slot 14 totals less than the width of the tongue the force opposing the movement of the roller can be brought to zero and then made negative, that is, the force can be made to tend to move the roller further to the left.

When the motion translator 10 is constructed in the manner shown in FIGURE 1 the roller 12 is free to travel over a course extending between the two points at which the point of attachment of the tongue 15 to the body 13 engages the plane upon which the motion translator 10 is mounted, that is, between the point at which there is no more tongue 15 to uncoil and the point at which there is no more body 13 to uncoil. The course over which the roller 12 can travel can be lengthened either by increasing the diameter of the roller 12 or by increasing the number of times the strip 11 is wrapped around the roller 12.

Figure 4:
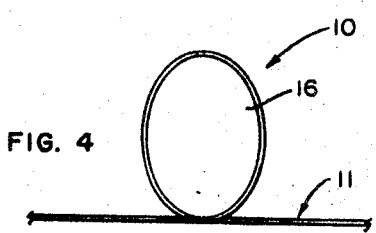
FIGURE 4 is a front view showing an alternate roller that may be employed in the device shown in FIGURE 1.
Figure 5:
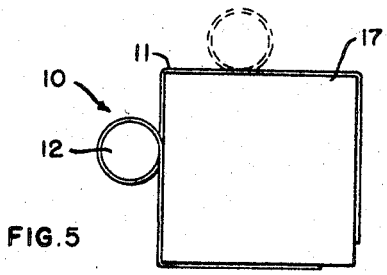
FIGURE 5 is a front view showing the device shown in FIGURE 1 mounted on a specially shaped member.

Referring now to FIGURE 4 it will be seen that the motion translator 10 can be employed with noncircular rollers such as the oval roller 16 shown therein. If an oval roller is employed in the motion translator shown in FIGURE 1 the roller 16 will tend to detent itself, i.e., to come to rest, on its high ends rather than on its flat sides. In FIGURE 5 the motion translator 10 shown in FIGURE 1 is shown mounted on a square block 17. It has been found that the motion translator 10 will move around the corners of such a block in a virtually frictionless manner providing that the strip 11 of the motion translator 10 is formed from a relatively flexible material.

Figure 6:
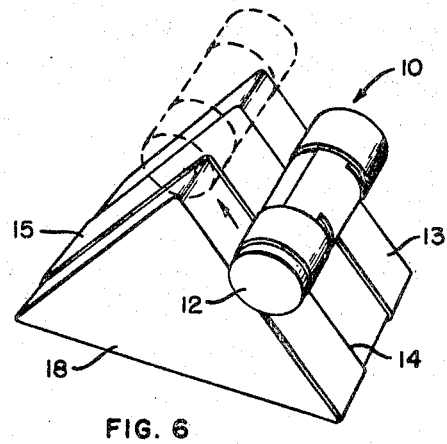
FIGURE 6 is a perspective view showing the device shown in FIGURE 1 mounted on a different specially shaped member.

Referring now to FIGURE 6 the motion translator 10 is shown mounted on a triangularly shaped block 18. If the strip 11 of the motion translator 10 is wrapped around the roller 12 and is then positioned with the point of attachment of the tongue 15 to the body 13 of the strip 11 positioned at the apex of the triangular block 18 and if the width of the tongue 15 of the strip 11 is made approximately equal to the sum of the widths of the portions of the body 13 of the strip 11 that border the slot 14 thereof, the roller 12 of the motion translator 10 will tend to position itself at the top of the triangularly shaped block 18, that is, in the position shown in dashed lines in the drawing, regardless of whether it is moved leftwardly or rightwardly from the top.

Although particular embodiments of the invention are shown in the drawing it should be understood that many modifications of the various component parts comprising the embodiments shown therein are possible without departing from the spirit of the invention. Various materials may be used for both the strip and the roller of the motion translator shown in the drawing and various geometrical configurations of the slot and the tongue of the strip and of the periphery of the roller are possible.

What is claimed is:

1. In a device for reversibly translating angular motion into lineal motion wherein the translating means comprises a flexible strip having a body at one end portion of said strip with a tongue tightened in a loop and frictionally engaging about a roller by extension through a slot in and projecting away from said body, the improvement characterized in that strip is fabricated from a resilient material for spring tensioning said loop, the body having axially extending slot bordering portions of widths totaling less than the width of said tongue for urging said roller toward said body.

References Cited

UNITED STATES PATENTS

| 2,947,185 | 8/1960 | Ziegler | 74—89.2 |
| 3,267,812 | 8/1966 | Hunkeler | 74—89.2 X |
| 3,367,195 | 2/1968 | Racine | 74—89.2 |
| 3,167,962 | 2/1965 | Scotto | 73—515 X |
| 3,344,675 | 10/1967 | Hellen | 73—517 |

FOREIGN PATENTS 506,211  5/1939  Great Britain.

MARTIN P. SCHWADRON, Primary Examiner

LUCIOUS L. JOHNSON, Assistant Examiner

U.S. Cl. X.R.

74—89.2